Nov. 19, 1963 A. LEWANDOWSKI 3,110,963
AQUARIUM PLANT PRUNER
Filed March 26, 1962
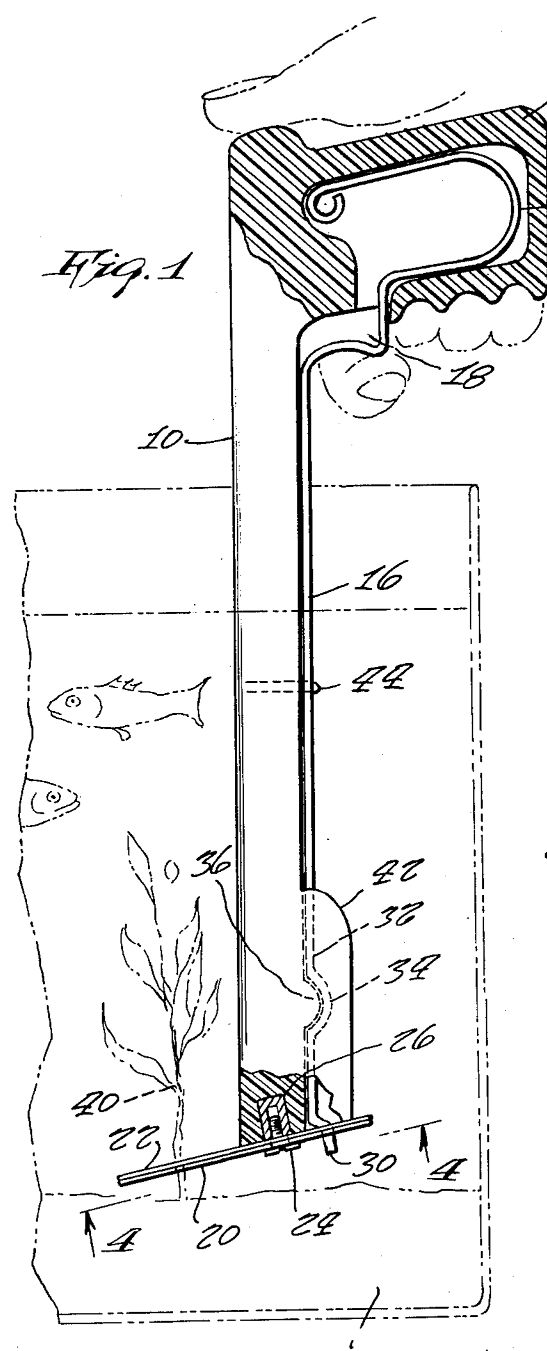
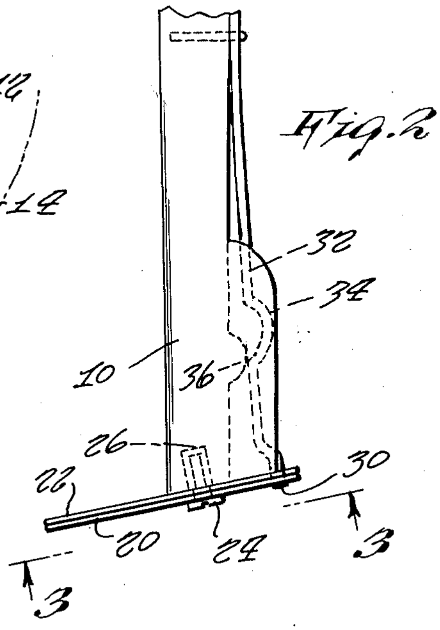
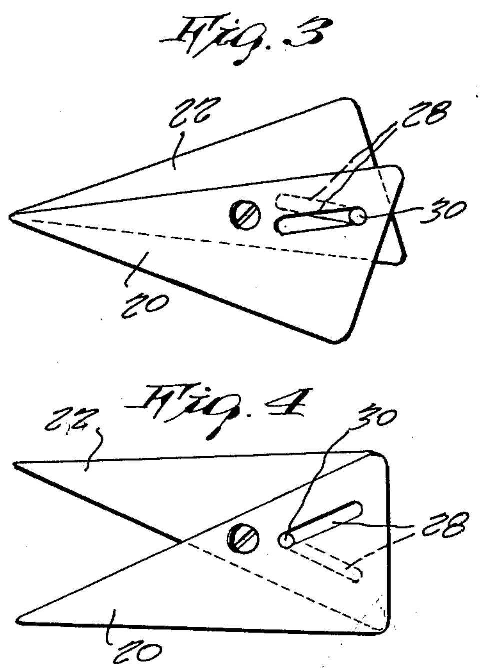
INVENTOR.
ADOLPH LEWANDOWSKI
BY
Carl Miller
ATTORNEY 3,110,963
Patented Nov. 19, 1963

3,110,963

AQUARIUM PLANT PRUNER

Adolph Lewandowski, 520 Knickerbocker Ave., Brooklyn 21, N.Y.

Filed Mar. 26, 1962, Ser. No. 182,475
2 Claims. (Cl. 30—248)

My invention relates to aquarium plant pruners.

It is an object of my invention to provide an aquarium plant pruner which can be used to cut and trim plants growing in an aquarium.

Another object of my invention is to provide an aquarium plant pruner which is trigger operated and can be operated without the necessity of the operator placing his hand into water.

Still another object of my invention is to provide an aquarium plant pruner which is characterized by both considerable ease in operation and by simple and economical construction.

These and other objects of my invention will either be explained or will become apparent hereinafter as this specification is studied in conjunction with the accompanying drawings wherein:

FIGURE 1 is a side view partially in cross section of an aquarium plant pruner in accordance with my invention.

FIGURE 2 is a fragmentary side view of the aquarium plant pruner of FIGURE 1 in an alternative position.

FIGURE 3 is a bottom view of the pruner of FIGURE 2 taken along the line 3—3 in FIGURE 2.

FIGURE 4 is a bottom view of the pruner of FIGURE 1 taken along the line 4—4 in FIGURE 1.

Referring now to the drawings, a plastic rod 10 is provided with a top, molded, hollow pistol grip handle 12. Positioned within handle 12 is a return spring portion 14 of a steel rod 16, another portion of this rod constituting a trigger 18. At the bottom of rod 10, I provide two moveable stainless steel blades 20 and 22 which are secured to the bottom of rod 10 by a pivot screw 24 which threads into a metal insert 26 anchored in the end of the rod. Each of blades 20 and 22 is provided with an angular slot 28. An offset bottom tip 30 of rod 16 fits into both slots 28. A section 32 of rod 16 adjacent tip 30 is provided with a curved cam follower 34 which cooperates with a fixed cam surface 36 on the side of plastic rod 10.

Initially, the aquarium plant pruner is in the position shown in FIGURES 1 and 4 with the cutting blades open. Then the cutting end of the plastic rod is placed in the aquarium 38 and is guided by the operator to the plant 40 to be cut. When this is accomplished, trigger 18 is squeezed, and return spring 14 is compressed. As a result, rod 16 moves upward and by the action of cam follower 34 and cam surface 36, the section 32 of the rod 16 supported between rod guide 42 and rod guide 44 is bent outward. The offset bottom tip 30 of rod 16 then moves upward and outward in slots 28 to cause cutting blades 20 and 22 to close in a scissor-like action, thereby cutting plant 40. FIGURES 2 and 3 show the aquarium plant pruner having the cutting blades in the closed position.

While I have shown and pointed out and described my invention with respect to the embodiment disclosed above, many modifications within the scope and sphere of my invention will be apparent to those skilled in the art. Consequently, my protection is to be limited only by the terms of the claims which follow.

Having thus described my invention, I claim as new and desire to secure by Letters Patent:

1. An aquarium plant pruner comprising a rod having a top molded hollow handle; cutting means secured to the bottom of said rod; and means extending between said handle and said cutting means for actuating and deactuating said cutting means, wherein said extending means include a trigger positioned adjacent said handle, wherein said cutting means are provided with slots and said extending means includes an offset tip extending within said slots, wherein said extending means is provided with a cam follower and said rod is provided with a cam surface over which said follower rides.

2. An aquarium plant pruner as set forth in claim 1 wherein said trigger, said tip and said cam follower form an integral unit.

References Cited in the file of this patent

UNITED STATES PATENTS

| | | |
|---|---|---|
| 1,741,172 | Huxman | Dec. 31, 1929 |
| 2,834,107 | Brunelle | May 13, 1958 |